US005768390A

United States Patent [19]
Coppersmith et al.

[11] Patent Number: 5,768,390
[45] Date of Patent: Jun. 16, 1998

[54] CRYPTOGRAPHIC SYSTEM WITH MASKING

[75] Inventors: Don Coppersmith, Ossining; Donald Byron Johnson, Pleasant Valley; Stephen Michael Matyas, Jr., Poughkeepsie, all of N.Y.

[73] Assignee: International Business Machines Corporation, Armonk, N.Y.

[21] Appl. No.: 895,713

[22] Filed: Jul. 17, 1997

Related U.S. Application Data

[63] Continuation of Ser. No. 548,119, Oct. 25, 1995, abandoned.

[51] Int. Cl.$^6$ .................. H04K 1/02; H04K 1/00; H04K 1/04; H04K 1/06; H04L 9/00
[52] U.S. Cl. ................. 380/42; 380/6; 380/29; 380/37; 380/43; 380/44; 380/45
[58] Field of Search ................. 380/6, 37, 29, 380/42, 43, 44, 45

[56] References Cited

U.S. PATENT DOCUMENTS

| 5,425,103 | 6/1995 | Shaw | 380/44 |
| 5,442,705 | 8/1995 | Miyano | 380/29 |
| 5,619,576 | 4/1997 | Shaw | 380/44 |

OTHER PUBLICATIONS

"Acronyms, Initialisms & Abbreviations Dictionary", © 1996 p. 798.

Schneier "Applied Cryptography", pp. 366–368 (1995) John Wiley & Sons.

Bruce Schneier, "Applied Cryptography", 2nd Ed. pp. 270–278 and 358–366. (J. Wiley & Sons Oct. 1995).

Jones, T.C., "Cipher–Chain–Cipher Modes of Operation of Block Ciphers", draft of Mar. 17, 1995.

Meyer, C.H. and Matyas, S.M., "Cryptography: A New Dimension in Computer Data Security", A Guide for the Design and Implementation of Secure Systems, John Wiley & Sons, Inc., New York, 1982, pp. 113–191.

Mitchell, C.J. and Varadharajan, V., "Modified Forms of Cipher Block Chaining", Computers and Security, 10, 1991, pp. 37–40.

*Primary Examiner*—Thomas H. Tarcza
*Assistant Examiner*—Hrayr A. Sayadian
*Attorney, Agent, or Firm*—William A. Kinnaman, Jr.

[57] ABSTRACT

A system for cryptographically transforming a sequence of input blocks of plaintext or ciphertext data into corresponding sequence of output blocks of data while providing enhanced protection against cryptographic attacks. Each input block is enciphered using a first key to generate a first encryption product, which is combined with a first secret masking value generated independently of the input blocks to generate a masked first encryption product. Each masked first encryption product is then enciphered using a second key to generate a second encryption product, which is combined with a second secret masking value generated independently of the input blocks to generate a masked second encryption product. Finally, each masked second encryption result is enciphered using a third key to generate an output block corresponding to the input block.

25 Claims, 4 Drawing Sheets

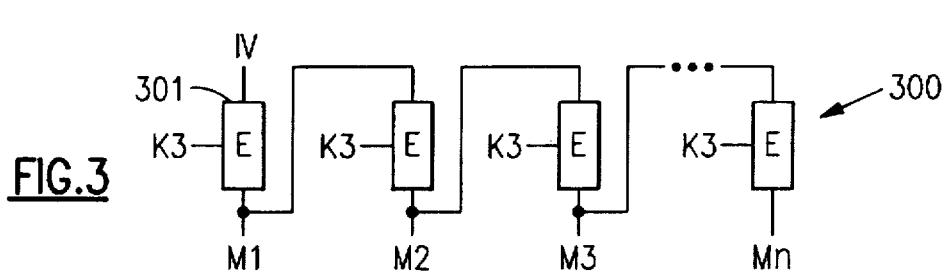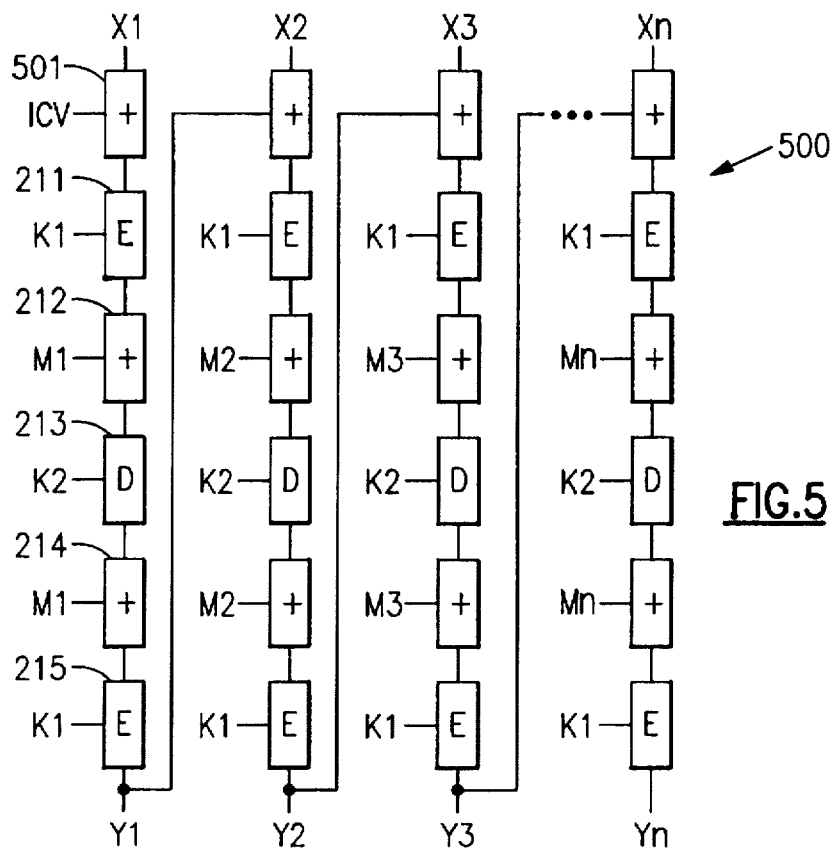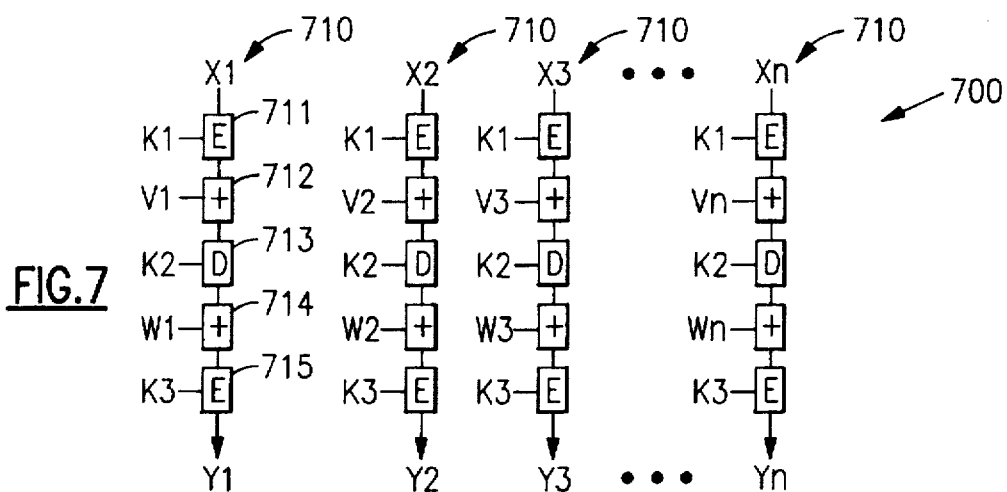

CRYPTOGRAPHIC SYSTEM WITH MASKING

This application is a continuation of application Ser. No. 08/548,119, filed Oct. 25, 1995, now abandoned.

BACKGROUND OF THE INVENTION

1. Field of the Invention

This invention relates to a method and apparatus for performing block encryption with multiple encipherment and, more particularly, to a method and apparatus for performing triple DES encryption, either in electronic code book (ECB) mode or cipher block chaining (CBC) mode.

2. Description of the Related Art

The Data Encryption Standard (DES) defines a well-known algorithm for encrypting data. DES specifies an encryption algorithm for transforming successive 64-bit blocks of plaintext into corresponding 64-bit blocks of ciphertext using an arbitrary 56-bit private key, together with a decryption algorithm for recovering the plaintext blocks from the ciphertext blocks using the same private key. A description of the DES algorithm may be found in FIPS Publication 46 (Jan. 15, 1977), as well as in C. H. Meyer et al., *Cryptography: A New Dimension in Computer Data Security* (1982), pp. 113–191, both of which publications are incorporated herein by reference.

Although the DES algorithm has generally been regarded as a secure algorithm, continuing improvements in processing power threaten to make the DES algorithm (together with other encryption algorithms having a comparable block size and key length) vulnerable to brute-force attacks of various types, including key exhaustion and dictionary attacks as described below. However, since the DES algorithm represents a considerable investment in hardware, software and user expertise, efforts have been directed towards enhancing the DES algorithm to increase its cryptographic strength, rather than replacing it with some different and less thoroughly tested algorithm.

Various expedients have been previously suggested for reducing the vulnerability of the DES algorithm to cryptographic attacks. These alternatives often involve multiple encryption, cipher block chaining (CBC), where the output for one block is chained to the input for the next block, and the like.

ANSI X9.F.1 is developing a suite of modes of operation for triple DES encryption (Triple DES) in the X9.52 draft standard. One of these modes is termed cipher block chaining (CBC) with external (ciphertext) feedback. Referring to FIG. 1, this mode of operation takes 64-bit input blocks $X(i)$, where $1 \leq i \leq n$, and encrypts them into 64-bit output blocks $Y(i)$. More particularly, the first input block $X(1)$ is combined with a 64-bit initial chaining value ICV by bitwise modulo 2 (XOR) addition (101). The result of this initial operation is encrypted using the DES encryption algorithm and a first 56-bit key K1 (102). This first encryption product is then decrypted using the DES decryption algorithm and a second 56-bit key K2 to yield a second encryption product (103). The second encryption product is then encrypted using the DES encryption algorithm and the first key K1 to generate the first output block $Y(1)$ (104).

Each subsequent output block $Y(i)$ is generated from the corresponding input block $X(i)$ in a similar manner, except that in the initial operation (101), the input block $X(i)$ is combined with the output block $Y(i-1)$ for the previous input block $X(i-1)$ rather than the initial chaining value ICV.

Triple DES encryption with ciphertext feedback has several advantages. First, the input and output blocksize is 64 bits, the same as for normal DES. Second, it is backwards compatible with single-key DES encryption. Using one key value for all three key inputs results in the same output as a single DES encryption.

Third, it has limited error propagation. When one block of ciphertext is corrupted, this results in only two blocks of recovered plaintext being corrupted. This is known as the self-healing or self-synchronizing property of CBC encryption.

Fourth, it is resistant to cryptanalytic exhaustive key search attacks. Using two keys, if n is the number of known plaintext blocks, then the best known workfactor is $2^{112/n}$. Using three keys, the best known workfactor is $2^{112}$ with some known plaintext; having many known plaintext blocks does not appear to reduce this workfactor.

However, any multiple-key CBC mode of operation with outer feedback has some drawbacks as well. First, it has a potential text dictionary concern. Having known plaintext/ciphertext pairs allows entries in a dictionary to be built. The larger the dictionary, the better the chance to find a match in the dictionary for any specific ciphertext and the larger the amount of ciphertext, the better the chance for a matching entry to be found in a dictionary of a given size. In terms of the extremes, when using outer CBC with a 64 bit blocksize, if one has a dictionary of $2^{64}$ entries, then all ciphertext is exposed and if using one dictionary entry and the complementary property, it would take about $2^{63}$ ciphertext blocks to expect one of the ciphertext blocks to be known, revealing a secret.

(However, note that chaining is much better than no chaining, as otherwise a dictionary for information that has redundancy (e.g., text, code, etc.) will be much smaller and therefore much easier to build. In effect, doing chaining with a pseudorandom value ensures that a complete dictionary must correspond to the blocksize, which is the best that can be achieved.)

Considering just the total amount of encrypted text, the best chance for a match occurs when about ½ of the encrypted text is a secret and ½ is known, due to the birthday paradox. In this case, when about $2^{32}$ blocks of text have been encrypted, secret information should be expected to begin to leak; this is known as the crossover point, as exposures become possible at this point unless additional side conditions are assumed.

(Further note: If the same initialization vector is used for multiple encrypted messages, the first block of the message may have structure that can significantly reduce the size of the dictionary needed to reveal the first block. If this is a concern, a new random initialization vector should be used for each message or a new random confounder appended to the front of each message.)

Second, it has a potential matching ciphertext concern. Two ciphertexts can be expected to match by chance after about $2^{32}$ blocks have been encrypted. If this happens call them $Y(i)$ and $Y(j)$ for corresponding plaintext $X(i)$ and $X(j)$ which are secret. We know $Y(i-1) \oplus X(i) = Y(j-1) \oplus X(j)$ as the ciphertexts matched. ("$\oplus$" symbolizes the logical exclusive OR (XOR) operation.) Therefore we know $Y(i-1) \oplus Y(j-1) = X(i) \oplus X(j)$. If the plaintext has significant redundancy in it, for example, character data, there is a good chance that the value $X(i) \oplus X(j)$ will leak information. Therefore after about $2^{32}$ encryptions, one should expect secrecy to start to be lost in the general case without additional assumptions.

For these two reasons, it is advisable to limit the total amount of text encrypted under a n outer CBC method using a 64-bit blocksize to no more than $2^{32}$ blocks, which is $2^{35}$ bytes or 32 gigabytes (GB). For many applications, such a limit will not raise a concern. However, with the increasing network speeds and massive databases found today and the likelihood of even faster speeds and larger databases in the future, cryptographic systems that are more resistant to cryptanalytic attack are desirable.

T. C. Jones, in a recent paper entitled "Cipher-Chain-Cipher Modes of Operation of Block Ciphers" (Mar. 17, 1995 draft), proposes several encryption systems that are said to be resistant to cryptanalytic attacks. In one disclosed mode of operation, each plaintext block is DES encrypted using a first key K1, combined with a masking value using a XOR operation, and then DES decrypted using a second key K2 to generate a ciphertext block. An initializing vector is used as the masking value for the first plaintext block. The masking value for each subsequent plaintext block is obtained by performing a predetermined operation (such as DES encryption using a third key K3) on the masking value for the previous block. However, this system too has been found to be susceptible to attack. Specifically, if the initializing vector, two plaintext blocks and the corresponding ciphertext blocks are known, the second key K2 can be eliminated as a variable, permitting the first and third keys K1 and K3 (and from them, ultimately the second key K2) to be determined in a relatively small number of operations.

SUMMARY OF THE INVENTION

In general, the present invention contemplates a method and apparatus for cryptographically transforming one or more input blocks of data into one or more corresponding output blocks of data. Each input block is first enciphered a first time using a first key to generate a first encryption product, which is combined with a first secret masking value to generate a masked first encryption product. (The term "encipher" as used herein encompasses decryption as well as encryption operations. Similarly, the term "encryption product" as used herein encompasses the products of decryption operations as well as encryption operations.) Each masked first encryption product is then enciphered a second time using a second key to generate a second encryption product, which is combined with a second secret masking value to generate a masked second encryption product. Each masked second encryption product is then enciphered a third time using a third key to generate an output block corresponding to said input block. In a cipher block chaining (CBC) mode of operation, each input block subsequent to the first is combined with the output block generated for the previous input block before the initial enciphering step.

Preferably, the data blocks are 64-bit blocks, while the three encipherment operations are DES encryption with the first key, followed by DES decryption with the second key and DES encryption with the third key (which may be the same as the first key). The combining operations are preferably achieved by performing bitwise modulo 2 (XOR) addition.

The first and second masking values used for any single input block may be either the same or different. Preferably, the masking values for each subsequent input block are generated from the masking values for the previous input block using any one of a number of means, such as DES encryption, modular arithmetic or the like, via a parallel-running output feedback (OFB) mode as described below.

The generation of secret masking values in accordance with the present invention requires one additional encryption or comparable operation per input block. However, significantly increased protection is obtained against the threat of dictionary attacks that exploit the relatively small (64-bit) blocksize of the DES algorithm. Further, by using a masking value at two different points in the encryption pipeline, one avoids the above-noted weakness of the Jones system, since a key cannot be eliminated as a variable in a similar manner.

As noted below, the invention may be implemented as special-purpose hardware, as software executing on general purpose hardware, or some combination of the two. By "software" as used herein is meant a program storage device readable by a machine, tangibly embodying a program of instructions executable by the machine to perform method steps.

BRIEF DESCRIPTION OF THE DRAWINGS

FIG. 3 is a schematic block diagram of the masking value generator for generating the masking values used in the system shown in FIG. 2.

FIG. 5 is a schematic block diagram of another encryption system of the present invention, operating in the cipher block chaining (CBC) mode.

FIG. 7 is a schematic block diagram of a modified form of the system shown in FIG. 2, in which independently selected masking values are used before and after the middle encipherment step for each input block.

DESCRIPTION OF THE PREFERRED EMBODIMENTS

Electronic Codebook (ECB) Mode

Figure 1:
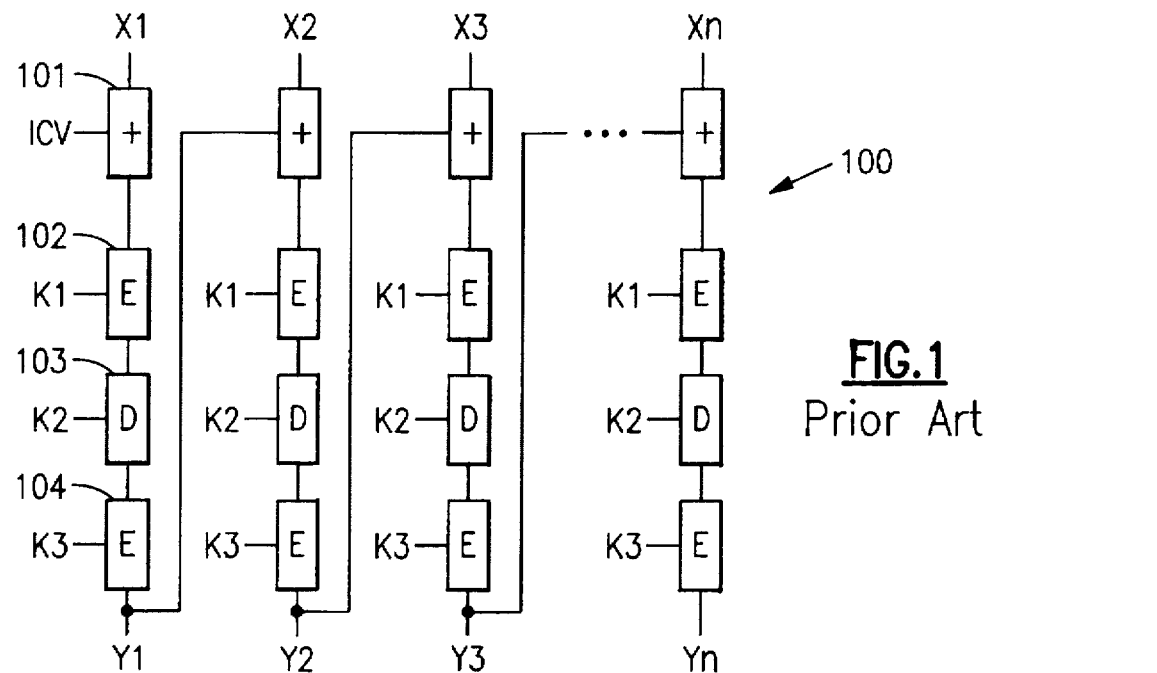
FIG. 1 is a schematic block diagram of a prior art block encryption system using triple encryption and cipher block chaining (CBC).
Figure 2:
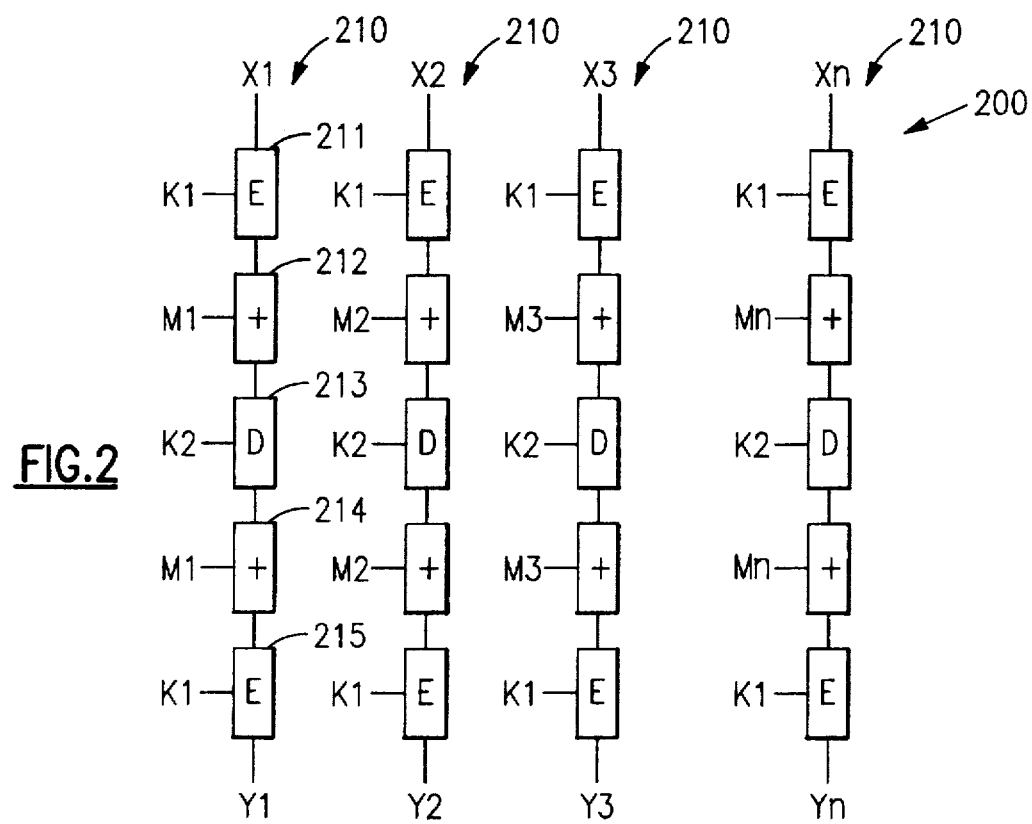
FIG. 2 is a schematic block diagram of one encryption system of the present invention, operating in the electronic codebook (ECB) mode.

FIG. 2 is a schematic block diagram of one encryption system 200 of the present invention with output feedback masking (OFBM), operating in the electronic codebook (ECB) mode. Like the system 100 shown in FIG. 1, system 200 takes 64-bit plaintext input blocks X(i), where $1 \leq i \leq n$, and converts them to 64-bit ciphertext output blocks Y(i).

System 200 comprises a plurality of iterations or "pipes" 210, each of which processes one plaintext block X(i). Each input block X(i) is first encrypted via a DES encryption operation 211 using a first 56-bit key K1. This first encryption product is combined with a 64-bit secret masking value M(i), via a bitwise modulo 2 addition (XOR) operation 212, to generate a first masked encryption product. The first masked encryption product is then decrypted using a DES decryption operation 213 and a second 56-bit key K2 to yield a second encryption product. The second encryption product is then combined with the same 64-bit masking value M(i), via another bitwise modulo 2 addition (XOR) operation 214, to generate a second masked encryption product. The second masked encryption product is then encrypted via a DES encryption operation 215 using the first key K1 to generate the output block Y(i).

System 200 (as well as the other encryption and decryption systems described herein) may be implemented as special-purpose hardware, a software program executed on a general-purpose digital computer, or some combination of special-purpose hardware, general-purpose hardware and software. The manner in which the various pipes 210 are realized depends on the manner of implementation. In a software implementation, pipes 210 may constitute successive iterations of an encryption routine for successive input blocks X(i). In a hardware implementation, pipes 210 may correspond to concurrently running parallel pipelines. Within each pipe 210, operations 211–215 may correspond either to separate hardware elements or programming executing concurrently or to programming instructions executing consecutively. The particular means of implementing pipes 210 or operations 211–215 within the pipes is not itself part of the present invention and hence is not described.

FIG. 3 is a schematic block diagram of the masking value generator 300 for generating the masking values M(i) used in the system 200 shown in FIG. 2. As shown in the figure, a 64-bit initializing vector IV is encrypted via a DES encryption operation 301 using a 56-bit key K3 to generate the first masking value M(1). Each subsequent masking value M(i) is generated from the previous masking value M(i−1) by encrypting it via a DES encryption operation 301 using the same key K3.

Figure 4:
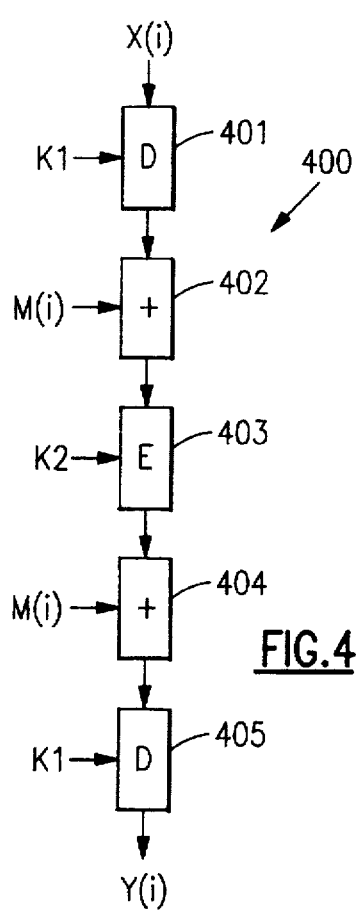
FIG. 4 is a schematic block diagram of the decryption system corresponding to the encryption system shown in FIG. 2.

FIG. 4 is a schematic block diagram of the decryption system 400 corresponding to the encryption system 200 shown in FIG. 2. Essentially, decryption system is the inverse of the encryption system shown in FIG. 2. Thus, system 400 takes 64-bit ciphertext input blocks Y(i), where $1 \leq i \leq n$, and converts them to 64-bit plaintext output blocks X(i). Each input block Y(i) is first decrypted via a DES decryption operation 401 using the first key K1. This first encryption product is combined with the 64-bit masking value M(i), via a bitwise modulo 2 addition (XOR) operation 402, to generate a first masked encryption product. The first masked encryption product is then encrypted via a DES encryption operation 403 using key K2 to yield a second encryption product. The second encryption product is then combined with the same masking value M(i), using another bitwise modulo 2 (XOR) addition 404, to generate a second masked encryption product. The second masked encryption product is then decrypted via a DES decryption operation 405 using the first key K1 to generate the output block X(i).

Figure 9:
FIG. 9 is a schematic block diagram of a cryptographic system incorporating the encryption and decryption systems of FIGS. 2 and 4 coupled via a common communications channel.
Figure 10:
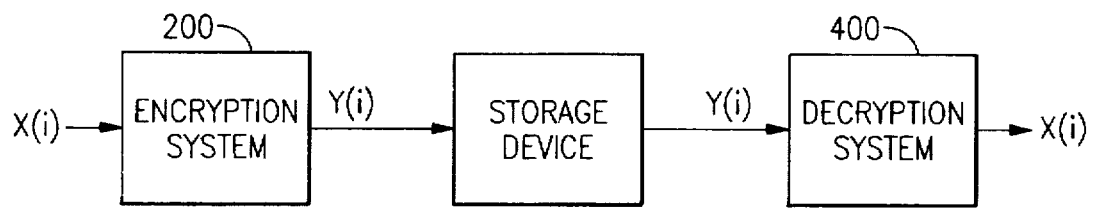
FIG. 10 is a schematic block diagram of a cryptographic system incorporating the encryption and decryption systems of FIGS. 2 and 4 accessing a common storage device.

The ciphertext blocks Y(i) produced by encryption system 200 are typically transmitted to decryption system 400, which recovers the plaintext blocks X(i). Alternatively, ciphertext blocks Y(i) may be stored for later retrieval by decryption system 400. A complete cryptographic system comprises an encryption system 200 and a decryption system 400 coupled via a common communications channel (as shown in FIG. 9) or accessing a common storage device (as shown in FIG. 10). Where there is two-way encrypted communication, apparatus at each end of the communication channel would include both an encryption system 200 and a decryption system 400.

With regard to a cryptanalytic key discovery attack, system 200 may be considered to be an ECB system with triple DES encryption, with the workfactors noted above.

With regard to a text dictionary attack, the adversary is forced to build a separate dictionary for each initializing vector IV and (since the masking values are different for each iteration) each iteration of encryption. The additional workfactor entailed thereby significantly increases the security of the system 200 against a dictionary attack.

Cipher Block Chaining (CBC) Mode

One limitation of the system 200 shown in FIG. 2 relates to pattern matching. Two different texts which have matching portions in the same relative position will have the same ciphertext for the matching portions when using the ECB mode with the same initializing vector IV. This reveals that the corresponding plaintexts have matching portions. Although no portion of the plaintext is revealed in this case, this form of matching may represent a security concern in some situations.

This potential matching concern is addressed by modifying the system so as to work in the cipher block chaining (CBC) mode. The CBC mode is a variation of the ECB mode wherein an outer ciphertext feedback is used to mask patterns in the plaintext.

Referring to FIG. 5, this latter encryption system 500 is similar to the ECB encryption system 200 shown in FIG. 2, except that each input block X(i) is first combined with a chaining value via a bitwise modulo 2 addition (XOR) operation 501 before being subjected to the first encryption 211. Thus, input block X(1) is combined with an initial chaining value ICV, while each subsequent input block X(i) is combined with the previous output block Y(i−1).

Figure 6:
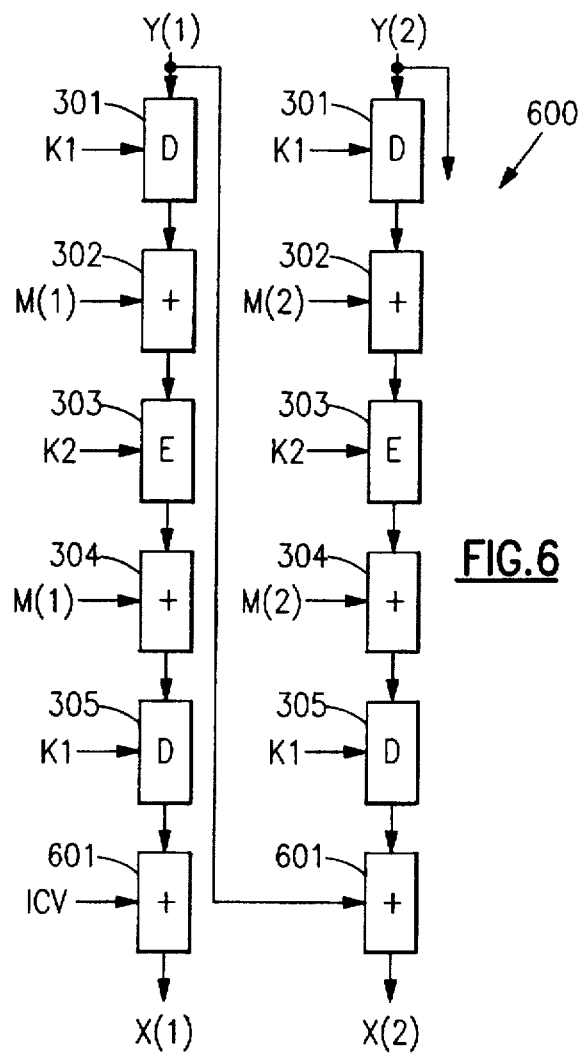
FIG. 6 is a schematic block diagram of the decryption system corresponding to the encryption system shown in FIG. 4.

FIG. 6 is a schematic block diagram of the decryption system 600 corresponding to the encryption system 500 shown in FIG. 5. Essentially, decryption system 600 is the inverse of the encryption system shown in FIG. 5. Decryption system 600 differs from the decryption 300 system of FIG. 3 in that the third encryption product for each input block Y(i) is combined with a chaining value, via a bitwise modulo 2 addition (XOR) operation 601, to form the output block X(i). Thus, for the first input block Y(1) the chaining value is an initial chaining value ICV, while for each subsequent input block Y(i) is combined with the previous output block Y(i−1).

With regard to a cryptanalytic key discovery attack, system 400 may be considered to be an CBC system with triple DES encryption, with the workfactors noted above.

With regard to a text dictionary attack, the above analysis for system 200 operating in the ECB mode holds. However, any redundancy in the natural language in the plaintext is scrambled before encryption so that it is maximally difficult (for the given blocksize) to find a match in any text dictionary that may be built.

Other Variations

In the embodiments described above, identical masking values M(i) are used both before and after the middle encipherment step for a given input block. Also, identical keys K1 are used for both the first and last encryption steps. Alternatively, independently selected keys may be used for each of the encipherment steps. Further, the masking values used before and after the middle encipherment step may be selected independently of each other.

FIG. 7 shows the encryption system 700 of an alternative embodiment of the present invention, operating in the ECB mode, in which independently selected keys K1–K3 are used for the three encipherment steps, while independently selected masking values V(i) and W(i) are used before and after the middle encipherment step for each input block. The corresponding decryption system is readily derived as the inverse of the encryption system 700 and is therefore not shown.

Encryption system 700 comprises a plurality of encryption pipes 710, each of which comprises combining and encipherment operations 711–715. Operations 711–715 are similar to operations 211–215 of system 200 (FIG. 2) except that encryption operation 715 uses an independently selected key K3 (rather than key K1), while combining operations 712 and 714 receive independently selected secret masking values V(i) and W(i).

Figure 8:
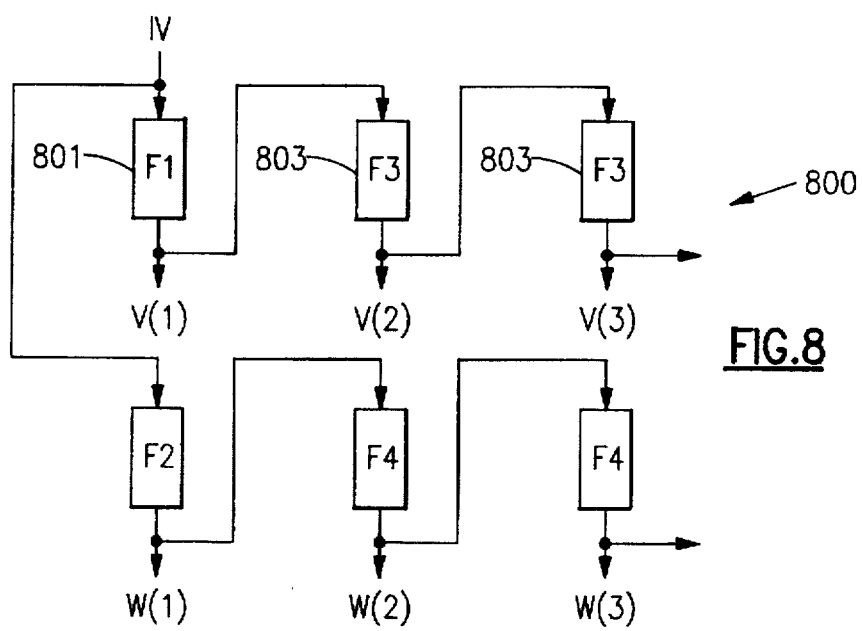
FIG. 8 is a schematic block diagram of the masking value generator for generating the masking values used in the system shown in FIG. 7.

FIG. 8 is a schematic block diagram of the masking value generator 800 for generating the masking values V(i) and W(i) used in the system 700 shown in FIG. 7. Masking value generator 800 is similar to masking value generator 300 (FIG. 3), except that two masking values are generated for each input block and the functional operations have been generalized. As shown in FIG. 8, a nonsecret initializing value IV is subjected to respective first and second functional operations 801 and 802 to generate the first masking values V(1) and W(1). Each subsequent masking value V(i) is generated from the previous masking value V(i−1) by subjecting the latter to a third functional operation 803, while, similarly, each subsequent masking value W(i) is generated from the previous masking value W(i−1) by subjecting the latter to a fourth functional operation 804.

Any one of several methods can be used to select independent sets of masking values V(i) and W(i). One such method is to let:

$$V(0) = K3 \oplus IV$$

$$W(0) = K1 \oplus IV$$

and $$V(i) = (V(i-1)*g + K2) \bmod p$$

$$W(i) = (W(i-1)*g + K2) \bmod p$$

for $i \geq 0$, V(i), where W(i) are secret variable mask values, K1–K3 are as defined in FIG. 7, IV is a nonsecret initializing value, p is the largest prime $< 2^{64}$, and g is a generator relatively prime to p (and about the size of p). The overall relation between each input block X(i) and output block Y(i) is given by the formula:

$$Y(i) = E(K3, W(i) \oplus D(K2, V(i) \oplus E(K1, X(i))))$$

where E(k, x) denotes DES encryption of x with key k and D(k, y) denotes DES decryption of y with key k.

Other methods may be used instead to generate independent masking values V(i) and W(i). Thus, a second method is to use DES encryption to produce V(i) and W(i). For this method:

$$V(0) = eK3(IV)$$

$$W(0) = eK1(IV)$$

$$V(i) = eK2(V(i-1)) \text{ for } i > 0$$

$$W(i) = eK2(W(i-1)) \text{ for } i > 0$$

where i is the index of the block of text being encrypted. This has the advantage of using a strong V and W (albeit at the cost of five encryptions per block).

A third method is to use an additive cyclic group to produce V(i) and W(i). For this method, let p be a large prime less than $2^{64}$.

$$V(0) = (K3 + IV) \bmod p$$

$$W(0) = (K1 + IV) \bmod p$$

$$V(i) = (K2 + V(i-1)) \bmod p \text{ for } i > 0$$

$$W(i) = (K2 + W(i-1)) \bmod p \text{ for } i > 0$$

where i is the index of the block of text being encrypted.

Although the system 700 shown in FIG. 7 operates in the ECB mode, it may be readily modified to operate in the cipher block chaining (CBC) mode by combining the previous ciphertext with the current plaintext prior to encryption, preferably by bitwise modulo 2 addition as described above.

Various other modifications will be apparent to those skilled in the art. Thus, DES encryption operations can generally be replaced with decryption operations, and vice versa. Also, various other methods of combining two values, such as modulo $2^n$ addition over n-bit fields of the two values, may be used instead.

What is claimed is:

1. A computer-implemented method of cryptographically transforming a sequence of input blocks of data into a corresponding sequence of output blocks of data, said sequence of input blocks comprising a first input block and one or more subsequent input blocks, each of said one or more subsequent input blocks having a previous input block, said method comprising the steps of:

enciphering each input block using a first key to generate a first encryption product;

combining each first encryption product by modular addition with a first secret masking value to generate a masked first encryption product, said first secret masking value being generated independently of said input blocks and being different for each subsequent input block;

enciphering each masked first encryption product using a second key to generate a second encryption product;

combining each second encryption product by modular addition with a second secret masking value to generate a masked second encryption product, said second secret masking value being generated independently of said input blocks and being different for each subsequent input block; and enciphering each masked second encryption product using a third key to generate an output block corresponding to said input block.

2. The method of claim 1 wherein said one or more input blocks are plaintext blocks and said one or more output blocks are ciphertext blocks.

3. The method of claim 2, comprising the further step of: transforming said ciphertext blocks back into said plaintext blocks.

4. The method of claim 2 wherein said ciphertext blocks are transmitted over a communications channel.

5. The method of claim 1 wherein said one or more input blocks are ciphertext blocks and said one or more output blocks are plaintext blocks.

6. The method of claim 5, comprising the initial step of: generating said ciphertext blocks from said plaintext blocks.

7. The method of claim 5 wherein said ciphertext blocks are transmitted over a communications channel.

8. The method of claim 1 wherein said first key and said third key are the same.

9. The method of claim 1 wherein said first key and said third key are different.

10. The method of claim 1 wherein said first masking value and said second masking value are the same.

11. The method of claim 1 wherein said first masking value and said second masking value are different.

12. The method of claim 1, comprising the further step of:

combining each subsequent input block by modular addition with the output block generated for the previous input block before the subsequent input block is enciphered with said first key.

13. The method of claim 12 wherein said first input block is combined with an initial chaining value before the subsequent input block enciphered with said first key.

14. The method of claim 1 wherein the first and second masking values used for each subsequent input block are generated from the first and second masking values used for the previous input block.

15. The method of claim 1 wherein the first and second masking values used for each subsequent input block are generated by enciphering the first and second masking values used for the previous input block.

16. Apparatus for cryptographically transforming a sequence of input blocks of data into a corresponding sequence of output blocks of data, said sequence of input blocks comprising a first input block and one or more subsequent input blocks, each of said one or more subsequent input blocks having a previous input block, said apparatus comprising:

first enciphering means for enciphering each input block using a first key to generate a first encryption product;

first masking means for combining each first encryption product by modular addition with a first secret masking value to generate a masked first encryption product, said first secret masking value being generated independently of said input blocks and being different for each subsequent input block;

second enciphering means for enciphering each masked first encryption product using a second key to generate a second encryption product;

second masking means for combining each second encryption product by modular addition with a second secret masking value to generate a masked second encryption product, said second secret masking value being generated independently of said input blocks and being different for each subsequent input block; and third enciphering means for enciphering each masked second encryption product using a third key to generate an output block corresponding to said input block.

17. The apparatus of claim 16, further comprising:

means for combining each subsequent input block by modular addition with the output block generated for the previous input block before the subsequent input block is enciphered with said first key.

18. The apparatus of claim 16 wherein said one or more input blocks are plaintext blocks and said one or more output blocks are ciphertext blocks, said apparatus further comprising:

means for transforming said ciphertext blocks back into said plaintext blocks.

19. The apparatus of claim 18 wherein said ciphertext blocks are transmitted over a communications channel.

20. The apparatus of claim 16 wherein said one or input blocks are ciphertext blocks and said one or more output blocks are plaintext blocks, said apparatus further comprising:

means for initially generating said ciphertext blocks from said plaintext blocks.

21. The apparatus of claim 20 wherein said ciphertext blocks are transmitted over a communications channel.

22. The apparatus of claim 16 wherein the first and second masking values used for each subsequent input block are generated from the first and second masking values used for the previous input block.

23. A program storage device readable by a machine, tangibly embodying a program of instructions executable by the machine to perform method steps for cryptographically transforming a sequence of input blocks of data into a corresponding sequence of output blocks of data, said sequence of input blocks comprising a first input block and one or more subsequent input blocks, each of said one or more subsequent input blocks having a previous input block, said method steps comprising:

enciphering each input block using a first key to generate a first encryption product;

combining by modular addition each first encryption product with a first secret masking value to generate a masked first encryption product, said first secret masking value being generated independently of said input blocks and being different for each subsequent input block;

enciphering each masked first encryption product using a second key to generate a second encryption product;

combining by modular addition each second encryption product with a second secret masking value to generate a masked second encryption product, said second secret masking value being generated independently of said input blocks and being different for each subsequent input block; and enciphering each masked second encryption product using a third key to generate an output block corresponding to said input block.

24. The program storage device of claim 23 wherein said method steps further comprise:

combining each subsequent input block by modular addition with the output block generated for the previous input block before the subsequent input block is enciphered with said first key.

25. The program storage device of claim 23 wherein the first and second masking values used for each subsequent input block are generated from the first and second masking values used for the previous input block.

* * * * *